United States Patent Office 3,629,205
Patented Dec. 21, 1971

3,629,205
THIOL DERIVATIVES OF OLEFIN-MALEIC
ANHYDRIDE COPOLYMERS
Walter Stamm, Tarrytown, N.Y., assignor to Stauffer
Chemical Company, New York, N.Y.
No Drawing. Filed Oct. 25, 1968, Ser. No. 770,798
Int. Cl. C08f 27/06, 45/58
U.S. Cl. 260—78.5                12 Claims

ABSTRACT OF THE DISCLOSURE

Olefin-maleic anhydride copolymers are provided wherein a portion of the anhydride moieties are converted to thio anhydride moieties. Other thio derivatives are also provided including the thio acids. These compounds are effective as stabilizers in vinyl type resins, particularly vinyl chloride polymers and can also serve as chelating agents.

---

The present invention relates to novel compositions of matter. More particularly, this invention relates to the thio derivatives of lower alpha-olefin-maleic anhydride copolymers.

The novel compositions of this invention find particular utility as stabilizers for vinyl resins, as rubber accelerators and curing agents, as chelating agents and as ion exchange resins of peculiar selectivity.

The ethylene-maleic anhydride copolymers and the isobutylene maleic anhydride copolymers are well known commercially available materials.

Certain of these copolymers of ethylene and maleic anhydride and the methods for the preparation thereof are set forth in U.S. Pat. 2,378,629. These resins are commercially available under the trademark name EMA. The methyl vinyl ether-maleic anhydride copolymer is available from General Aniline and Film Corporation under the trademark Gantrez An.

The thio derivatives of these compounds are novel and provide exceptional properties diverse and distinguished from those of lower olefin-maleic anhydride copolymers or related compositions, such as the methyl vinyl ether-maleic anhydride copolymers.

In accordance with this invention, polymeric compositions of matter are provided which can be represented generically by the following chemical structural formulas:

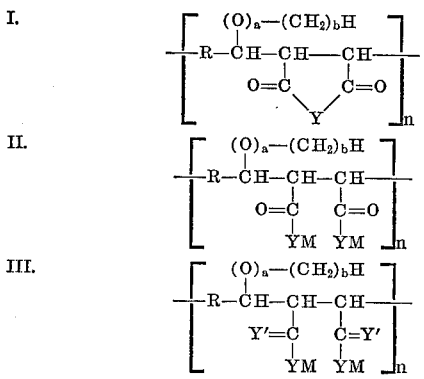

wherein R is a lower alkylene group of from one to five carbon atoms inclusive, $a$ is an integer having a value of from 0 to 1 and $b$ is an integer having a value of from 0 to 1 such that when $a=1$ $b$ also $=1$, M is a monovalent cation having a molecular weight less than 40, Y and Y' are chalcogens having molecular weights less than 34 with the provision that at least one Y per molecule must be sulfur and in Formula III above at least one

per molecule must be

As will be appreciated in Formulas I, II, and III above, the substituent $-(O)_a(CH_2)_bH$ represents $-H$, $-CH_3$, and $-OCH_3$. For convenience hereinafter, the substituent $-H$ will be employed as illustrative of these substituents.

Illustrative of the monovalent cations M defined above are hydrogen, lithium, sodium, potassium and ammonium. For convenience, hydrogen will be used hereinafter as illustrative of these monovalent cations.

Illustrative of the lower alkylene groups represented by R above are methylene, ethylene, propylene, butylene, pentylene and the like. For convenience hereinafter methylene will be used as illustrative of the lower alkylene groups.

Accordingly, more specific types of compounds encompassed by Formulas I–III above are set forth below.

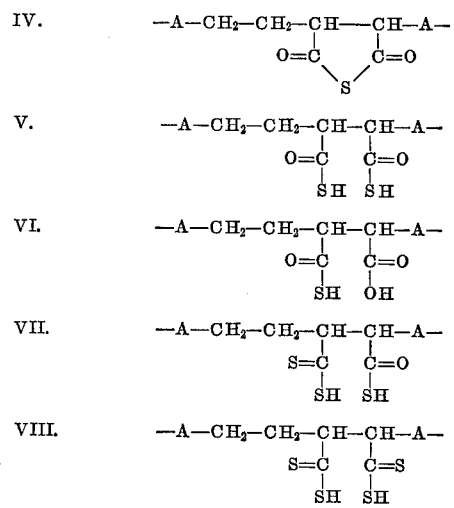

wherein —A— in each instance above is an anhydride or acid polymer fragment. In these polymeric structures, of course, the defined units are randomly occurring in the polymer chain and can occur in any sequence or combinations with the anhydride or acid formed by hydrolysis of the anhydride. In the instance wherein all of the anhydride functions are converted to the corresponding thio analogs then A will not be present and the polymer will be made up of the repeating defined units specified in the respective formulas above.

The novel compounds of this invention can be prepared directly from the copolymer precursor. For example, ethylene-maleic anhydride, propylene-maleic anhydride, isobutylene-maleic anhydride, styrene-maleic anhydride, or methyl vinyl ether-maleic anhydride copolymers as well as crosslinked copolymers. As illustrative, the ethylene maleic anhydride copolymer will be used hereinafter. The ethylene-maleic anhydride copolymer can be prepared in accordance with any of the known prior art procedures. Ethylene and maleic anhydride copolymerize only in substantially equimolar proportions, even when one of the comonomers is present in excess. This reactivity would indicate that the structure of the copolymer is one of substantially uniform alternation of ethylene and maleic anhydride to form a polymer having a structure of the following form:

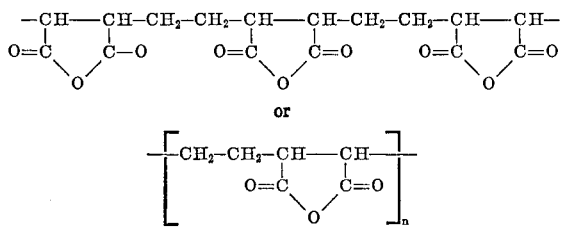

wherein $n$ is an integer greater than 3. These maleic anhydride copolymers may also be crosslinked through their alkylene backbone.

From the precursor ethylene-maleic anhydride copolymer the compounds of this invention can be prepared in accordance with the following reaction scheme:

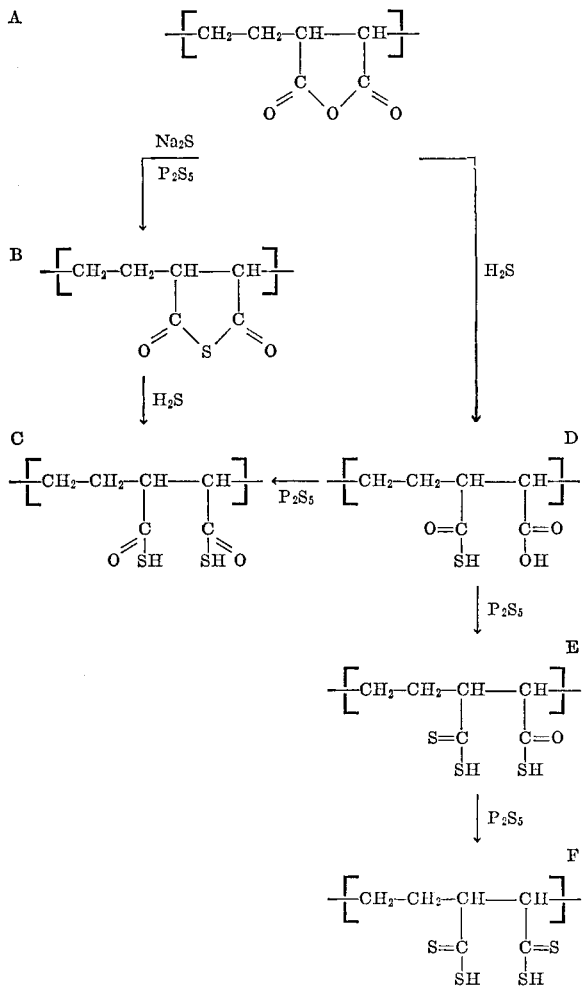

While a specific ethylene-maleic anhydride unit is employed in the reaction scheme above, it will be realized that this is somewhat simplified. The respective reactions can occur at any of the unit sites. The effective chain length of the products of this invention will be substantially the same as the precursor ethylene-maleic anhydride copolymer. Additionally, while the polymer products of this invention must have at least one thio conversion per molecule, 100% conversion is possible although it may not in all instances be practical in commercial operation.

The repeating units of the polymeric compounds as represented above by —$n$— are generally from about 3 to about 10,000 inclusive although $n$ preferably has a value of from about 25 to about 1000 inclusive.

Considering each of the generic compounds set forth above independently, sodium sulfide or phosphorus penta- sulfide can be employed in a stoichiometric amount based upon the weight of the ethylene-maleic anhydride copolymer precursor, although it is generally desirable to use this material in excess unless only a partial conversion to the thiol anhydride is desired.

Reaction A—B is preferably conducted in a polar, aprotic solvent medium such as acetonitrile, acetone, dimethylformamide, dioxane, dimethyl sulfoxide, dimethyl sulfone, dimethylacetamide, pyridine, xylene and the like. However, this reaction can also be conducted in the absence of a solvent medium by intimately mixing or fusing the reactants.

This reaction can be effected at a temperature of from below room temperature to the reflux temperature of the solvent and higher. It is preferred to conduct this reaction at a temperature of from about 0° C. to about 150° C. Of course, as will be appreciated if temperatures in excess of the reflux temperature of the solvent are employed, then superatmospheric pressures must also be utilized and appropriate pressure equipment.

In respect to the preparation of generic compound C above, this is easily accomplished by treating compound B, the thiol anhydride, with hydrogen sulfide. Compound B can be separated or the reaction mixture can be simply treated with hydrogen sulfide. The hydrogen sulfide can be used in stoichiometric amounts, although an excess is preferred unless a partial reaction is desired.

The hydrogen sulfide is effectively admixed with the precursor compound B, i.e., thiol anhydride, by dissolving the thiol anhydride in a suitable aprotic anhydrous solvent, such as has been described above, and sparging $H_2S$ through this solution. Alternative techniques, of course, can be employed and elevated pressures can be utilized, if desired.

This reaction is preferably conducted at a temperature of from about —20° to about 200° C. inclusive, although temperatures of from about 0° to about 100° C. are preferred.

Compounds represented by Formula D above can be prepared by dissolving the ethylene-maleic anhydride copolymer precursor in a suitable aprotic solvent and reacting this precursor with hydrogen sulfide. Again, the hydrogen sulfide is preferably sparged as a gas through the solution of precursor, although liquid hydrogen sulfide can also be used at temperatures below 0° C. and under superatmospheric pressures. It is preferred to employ an excess of the hydrogen sulfide reactant. Solvents which can be employed include any of the following: ethers, esters, hydrocarbons, nitriles, sulfides, carbon bisulfide, and the like.

These reactions are preferably conducted at temperatures of from about —40° to about 200° C. Preferred temperatures are from about —20° to about 100° C.

Compounds E and F above are prepared in a similar manner to compound B except that, as indicated, the starting material in this instance is compound D except that compound E, of course, can be converted to compound F as indicated. Phosphorus sulfide or sodium sulfide can effectively be employed as the sulfur donating reagent. The temperatures for this reaction range from about 25° C. to about 200° C. and preferably from about 50° C. to about 150° C. Aprotic solvents as indicated above can be employed to advantage in which case reflux temperatures can be employed. Temperatures in excess of reflux can be employed by fusion or autogenous pressures.

Ethylene-maleic anhydride copolymers containing the units represented by Formulas B, C, D, E, and F above have found particular utility as stabilizers for vinyl polymers most particularly vinyl chloride polymers wherein the polymer contains a predominant amount of polymerized vinyl chloride monomer. When used in this application, it can be used directly as the thiolanhydride B, which is preferred, or it can be used as the mixed thio-oxo-acids (B, D, E and F) or thio acid per se. In respect to the mixed thio-oxo-acids represented by Formulas C, D, E, and F, these compounds can be employed also as salts. In this respect, it is desirable to employ the zinc, calcium, cadmium, barium, strontium, and tin or organo tin salts.

Compounds D, C, E, and F above, particularly the higher molecular weight compounds, i.e., where $n$ is an integer of from about 100 to about 10,000 inclusive, are particularly useful as ion exchange resins with particular selectivity to the noble metals especially those of the platinum group as well as silver, gold, and nickel. Compounds represented by Formulas B, C, D, E and F above also serve effectively as rubber curing agents and accelerators.

Additionally the novel compositions of this invention can be used as resin binders, in surface coatings, as detergent builders, as thickeners, as cutting fluids, as pigment dispersants and as paper and textile sizes and finishes.

In respect to the use of these compounds as stabilizers for vinyl chloride resins, it is intended that vinyl chloride resins include both the homopolymers as well as copolymers with other copolymerizable vinyl resins.

By the term "vinyl polymers" is intended polymers containing polymerized vinyl monomers having the structure

Such monomers generally contain from 2 to about 18 carbon atoms, inclusive, and can be illustrated by the following: Lower α-olefin monomers such as ethylene, propylene, butene, and the like; the aromatic vinyl monomers such as styrene, α-methyl styrene, chlorostyrene, and the like; vinyl and vinylidene halides such as vinyl chloride, vinyl fluoride, vinylidene chloride, vinylidene bromide, and the like; vinyl esters such as vinyl formate, vinyl acetate, vinyl propionate, vinyl butyrate, vinyl chloroacetate, vinylchloropropionate, and the like; acrylic and alpha-alkyl acrylic acids, their amides, and their nitriles such as acrylic acid, chloroacrylic acid, methacrylic acid ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-di-methylacrylamide, methacrylamide, N-methyl methacrylamide, N,N-dimethylmethacrylamide, acrylonitrile, chloroacrylonitrile, methacrylonitrile, ethacrylonitrile, and the like; maleic and fumaric acids, and their esters such as dimethyl maleate, diethyl maleate, monobutyl maleate and the like; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone, and the like; N-methyl-N-vinyl acetamide, N-vinyl carbazole, N-vinyl pyrrolidone, ethyl methylene malonate and the like.

The term "vinyl polymers" is intended to include both homopolymers of such vinyl monomers as well as the vinyl copolymers formed by the interpolymerization of two or more of the copolymerized vinyl monomers.

When used as a stabilizer in such use it is desirable to employ a stabilizing amount. This amount is generally from about 0.5 to about 5.0% weight based upon the vinyl chloride resin employed, but larger amounts can also be used effectively if desired.

In respect to the ethylene-maleic anhydride copolymer employed as precursor, there will be a wide degree of variation in molecular weight dependent upon the molecular weight of this precursor. The higher molecular weight polymers and cross linked polymers tend to be less soluble in conventional solvents and the viscosity of solutions of such polymers are markedly higher than solutions of the lower molecular weight polymers. The higher molecular weight polymers are accordingly more difficult to formulate. In general, the preferred materials for vinyl resin stabilization are those having molecular weights such that the polymers have a specific viscosity below about 100 cps. when measured as a one-weight percent solution in dimethyl formamide at 25° C.

When the compounds of this invention are employed as stabilizers in vinyl chloride polymers such as polyvinyl chloride, vinyl chloride-vinyl acetate copolymers, vinyl chloride-acrylonitrile copolymers and the like, they can effectively be employed with other stabilizers and antioxidants. Conventional stabilizers which can be used as co-stabilizers are the barium, cadmium, zinc and calcium salts of fatty acids such as the stearates, laurates, oleates, and the like; the tin stabilizers such as butyl stannoic acid; organo phosphites and sulfites.

In the examples which follow and throughout the specification, all parts and percentages are by weight unless specifically indicated to the contrary.

EXAMPLE 1

Poly(ethylene-maleic thiolanhydride)

One-hundred-twenty-six parts of finely powdered poly (ethylene-maleic anhydride) resin (Monsanto EMA-11) are thoroughly mixed with about 150 parts of commercial sodium sulfide (65%). The mixture is slowly warmed to a temperature of about 90° C. and maintained at this temperature for a period of about five hours. Near the end of this period a high vacuum is applied to remove water from the mixture. After cooling, the crude reaction product is ground to give a fine, light yellow solid product. Spectrographic, elemental and titrimetric analyses show that most of the anhydride functions are converted to thiolcarboxylic anhydride. The crude product is protected from exposure to moisture or bright sunlight. It exhibits a slight mercaptan-type odor.

EXAMPLE 2

Example 1 is repeated using 180 parts of $P_2S_5$ instead of $Na_2S$. A minor amount of hydrogen sulfide evolved which is removed from the mixture by applying reduced pressure. The crude reaction product is a highly viscous, hygroscopic material.

EXAMPLE 3

About 100 parts of finely powdered poly (ethylene-maleic anhydride) resin (Monsanto EMA-31) are dispersed in 100 ml. of xylene. About 150 parts of powdered phosphorus pentasulfide is added, and the vigorously agitated dispersion is slowly brought up to reflux temperature. Reflux is continued for about four hours. A relatively pure poly (ethylene-maleic thiolanhydride) product is isolated from the xylene phase by liquid-liquid extraction techniques.

EXAMPLE 4

Poly(ethylene-dithiolmaleic acid)

The crude poly(ethylene-maleic thiolanhydride) resin obtained from Example 1 is dissolved in 800 parts of diglyme. At room temperature, this solution is saturated with hydrogen sulfide, a few drops of sulfuric acid are added and then the solution is brought to reflux temperature while fresh hydrogen sulfide is blown through the agitated solution at 40° C. for three hours. Acetone solvent is then removed by distillation. The residual waxy, very light yellow colored reaction product is analyzed by iodine titration and IR spectroscopy. It is found to contain thiolcarboxylic acid groups as postulated and only minor quantities of carboxylic acid groups.

EXAMPLE 5

Poly(ethylene-maleic monothiolcarboxylic acid)

By a procedure analogous to the method described in Example 4, poly (ethylene-maleic anhydride) (Monsanto EMA-21) is thiolized with hydrogen sulfide in glyme to give a polymeric ethylene-maleic monothiolcarboxylic acid having a melting point >180° C.

EXAMPLE 6

The procedure of Example 5 is repeated using a methylvinylether-maleic anhydride copolymer of the GAF Corporation (Gantrez AN resin). Polymeric (methylvinylether-maleic monothiolcarboxylic acid) is obtained in good purity after evaporating the solvent.

EXAMPLE 7

The reaction product of Example 5 is dissolved in water and neutralized with sodium hydroxide, to about pH 8. By removing water quantitatively at reduced pressure and elevated temperatures, the sodium salt of poly(ethylene-maleic thiolcarboxylic acid) is obtained in practical quantitative yield.

EXAMPLE 8

The reaction product of Example 5 is dissolved in dioxane and refluxed for six hours with agitation in the presence of a stoichiometric amount of powdered zinc oxide. After cooling the colorless zinc salt of poly(ethylene-maleic thiolcarboxylic acid) is isolated by filtration. The salt is purified by washing it with small amounts of cold water and with methanol.

EXAMPLE 9

Three parts of the reaction product of Example 3 are blended with 100 parts of PVC (Geon 103 EP), 1 part of stearic acid lubricant and 30 parts of DOP plasticizer. This blend is fused on a two-roll chrome-plated mill at 335° F. for 30 minutes. The resulting flexible PVC film (12 mils) is clear and practically colorless. When the same experiment is run using the corresponding precursor anhydride resin instead of the poly-thiolanhydride of Example 3, strong discoloration of the film begins after a few minutes.

EXAMPLE 10

Example 9 is repeated using 0.5 part of the zinc salt reaction product of Example 8 together with 1.5 parts of calcium stearate and 0.5 part of tris-nonylphenyl phosphite. Geon 103 resin does not show discoloration after 20 minutes milling time at 330° F.

What is claimed is:

1. A polymeric compound of the formula

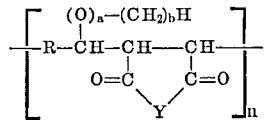

wherein R is a lower alkylene group of from 1 to 5 carbon atoms inclusive, $a$ is an integer having a value of from 0 to 1, $b$ is an integer having a value of from 0 to 1, such that when $a$ equals 1 $b$ also equals 1, $n$ represents the number of repeating units and has a value of from about 3 to about 10,000 inclusive and and Y is a chalcogen having a molecular weight less than 34 with the proviso that at least one Y per molecule must be sulfur.

2. The polymeric compound of claim 1 wherein R is methylene and $a$ and $b$ equals 0.

3. The polymeric compound of claim 1 wherein $n$ has a value of from about 25 to about 1,000 inclusive.

4. A polymeric compound of the formula

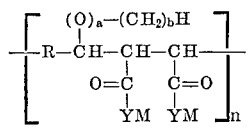

wherein R is a lower alkylene group of from 1 to 5 carbon atoms inclusive, $a$ is an integer having a value of from 0 to 1, $b$ is an integer having a value of from 0 to 1 such that when $a$ equals 1 $b$ also equals 1, M is a monovalent cation having a molecular weight less than 40, Y is a chalcogen having a molecular weight less than 34 with the proviso that at least one Y per molecule must be sulfur and $n$ is the number of repeating units of the molecule having the value of from about 3 to about 10,000 inclusive.

5. The polymeric compound of claim 4 wherein R is methylene and $a$ and $b$ equals 0.

6. The polymeric compound of claim 4 wherein $n$ is an integer having a value of from about 25 to about 1,000 inclusive.

7. Composition of claim 4 wherein M is hydrogen.

8. Composition of claim 4 wherein M is sodium.

9. A polymeric compound having the formula

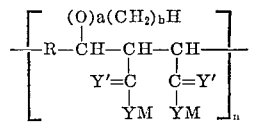

wherein R is a lower alkylene group of from 1 to 5 carbon atoms inclusive, $a$ is an integer having a value of from 0 to 1 and $b$ is an integer having a value of from 0 to 1 such that when $a$ equals 1 $b$ also equals 1, M is a monovalent cation having a molecular weight less than 40, Y and Y' are chalcogens having molecular weights less than 34 with the proviso that at least one

substituent per molecule must be

and $n$ is the number of repeating units in the molecule having a value of from about 3 to about 10,000 inclusive.

10. The polymeric compound of claim 9 wherein $n$ is an integer having a value of from about 25 to about 1,000 inclusive.

11. The polymeric compound of claim 9 wherein R is methylene, $a$ and $b$ are 0, and M is hydrogen.

12. The polymeric compound of claim 11 wherein M is sodium.

References Cited

UNITED STATES PATENTS 3,472,772   11/1969   Chambers et al. _____ 252—34.7

JOSEPH L. SCHOFER, Primary Examiner

J. KIGHT III, Assistant Examiner

U.S. Cl. X.R.

260—45.7, 79.5, 876, 899